US012762985B2

(12) United States Patent
Yan et al.

(10) Patent No.: US 12,762,985 B2
(45) Date of Patent: Oct. 13, 2026

(54) THIN-FILM TRANSISTOR, PIXEL CIRCUIT, AND DRIVING METHOD FOR PIXEL CIRCUIT

(71) Applicants: Hefei Visionox Technology Co., Ltd., Hefei (CN); Yungu (Gu'an) Technology Co., Ltd., Langfang (CN)

(72) Inventors: Guowen Yan, Hefei (CN); Zidong Guo, Hefei (CN); Dejian Wang, Hefei (CN); Fa-Hsyang Chen, Hefei (CN)

(73) Assignees: Hefei Visionox Technology Co., Ltd., Hefei (CN); Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 19/010,178

(22) Filed: Jan. 6, 2025

(65) Prior Publication Data

US 2025/0273114 A1 Aug. 28, 2025

(30) Foreign Application Priority Data

Feb. 26, 2024 (CN) ......................... 202410212096.1

(51) Int. Cl.
*G09G 3/3233* (2016.01)
*G09G 3/20* (2006.01)

(52) U.S. Cl.
CPC ......... *G09G 3/2007* (2013.01); *G09G 3/3233* (2013.01); *G09G 2300/0814* (2013.01); *G09G 2300/0819* (2013.01); *G09G 2300/0852* (2013.01); *G09G 2300/0861* (2013.01); *G09G 2310/06* (2013.01); *G09G 2310/08* (2013.01); *G09G 2320/0233* (2013.01)

(58) Field of Classification Search
CPC ......... G09G 3/3233; G09G 2300/0814; G09G 2300/0819; G09G 2300/0852; G09G 2300/0861; G09G 2310/06; G09G 2310/08; G09G 2320/0233
See application file for complete search history.

(56) References Cited

U.S. PATENT DOCUMENTS

2018/0190194 A1* 7/2018 Zhu ........................ H10D 86/00
2020/0126485 A1* 4/2020 Moon .................. G09G 3/3291

FOREIGN PATENT DOCUMENTS

CN 114822416 A 7/2022

* cited by examiner

*Primary Examiner* — Dennis P Joseph
(74) *Attorney, Agent, or Firm* — Kilpatrick Townsend & Stockton LLP

(57) ABSTRACT

Embodiments of the present disclosure disclose a thin-film transistor, a pixel circuit, a driving method for a pixel circuit, and a display panel. The thin-film transistor is applied to a pixel circuit, and the thin-film transistor includes a first gate and a second gate, the first gate and the second gate being located on two opposite sides of an active layer of the thin-film transistor, where the first gate is applied with a data voltage, and the second gate is configured to: use at least two different voltages within different preset grayscale intervals, and use the same voltage within the same preset grayscale interval.

16 Claims, 8 Drawing Sheets

THIN-FILM TRANSISTOR, PIXEL CIRCUIT, AND DRIVING METHOD FOR PIXEL CIRCUIT

CROSS-REFERENCE TO RELATED APPLICATION

The present application claims priority to Chinese Patent Application No. 202410212096.1 filed on Feb. 26, 2024, and titled "THIN-FILM TRANSISTOR, PIXEL CIRCUIT, DRIVING METHOD FOR PIXEL CIRCUIT, AND DISPLAY PANEL", which is incorporated herein by reference in its entirety.

TECHNICAL FIELD

Embodiments of the present disclosure relate to the field of display technologies, and in particular, to a thin-film transistor, a pixel circuit, and a driving method for a pixel circuit.

BACKGROUND OF THE INVENTION

With the development of display technologies, people have increasingly higher requirements for the display quality of display panels.

A display panel typically includes pixel circuits and light emitting devices. The light emitting devices are driven by the pixel circuits to emit light, thereby achieving the function of image display. The pixel circuits include thin-film transistors.

SUMMARY OF THE INVENTION

Embodiments of the present disclosure provide a thin-film transistor, a pixel circuit, a driving method for a pixel circuit, and a display panel, in order to improve the driving effect of a pixel circuit that uses the thin-film transistor, thereby enhancing the display effect of the display panel.

According to an aspect of the present disclosure, a thin-film transistor is provided. The thin-film transistor is applied to a pixel circuit, and the thin-film transistor includes a first gate and a second gate, the first gate and the second gate being located on two opposite sides of an active layer of the thin-film transistor, where the first gate is applied with a data voltage, and the second gate is configured to: use at least two different voltages within different preset grayscale intervals, and use the same voltage within the same preset grayscale interval.

Optionally, the preset grayscale intervals include a first preset grayscale interval, a second preset grayscale interval, and a third preset grayscale interval, where any grayscale within the first preset grayscale interval is less than any grayscale within the second preset grayscale interval, and any grayscale within the second preset grayscale interval is less than any grayscale within the third preset grayscale interval; and a voltage applied to the second gate within the third preset grayscale interval is at least different from a voltage applied to the second gate within the first preset grayscale interval.

Optionally, within the first preset grayscale interval, a voltage applied to the second gate is a first voltage;

- within the second preset grayscale interval, the voltage applied to the second gate is a second voltage; and
- within the third preset grayscale interval, the voltage applied to the second gate is a third voltage, where a direction of the first voltage is opposite to a direction of the data voltage, and a direction of the second voltage and a direction of the third voltage are both the same as the direction of the data voltage.

Optionally, the first voltage is an adjustable voltage, and the second voltage and the third voltage are both fixed voltages;

- optionally, a ratio of the first voltage to the data voltage ranges from −2 to −0.2; and
- optionally, the second voltage is reused as the third voltage, and an absolute value of the second voltage ranges from 0 V to 7 V.

Optionally, the first voltage is an adjustable voltage, and the second voltage and the third voltage are both adjustable voltages;

- optionally, a ratio of the first voltage to the data voltage ranges from −2 to −0.2; and
- optionally, a ratio of the first voltage to the data voltage ranges from −2 to −0.2; and
- optionally, the first voltage is an adjustable voltage, the second voltage is a fixed voltage, and the third voltage is an adjustable voltage;
- optionally, a ratio of the first voltage to the data voltage ranges from −2 to −0.2; and
- optionally, an absolute value of the second voltage ranges from 0 V to 7 V, and a ratio of the third voltage to the data voltage ranges from 0.2 to 2.

According to another aspect of the present disclosure, a pixel circuit is provided. The pixel circuit includes a driving module, a first voltage writing module, a second voltage writing module, and a light emitting module, where the driving module includes the thin-film transistor according to any embodiment of the present disclosure; and

- the first voltage writing module is connected to the thin-film transistor, and is configured to transmit the data voltage to the thin-film transistor, so that the data voltage is written to a first gate of the thin-film transistor;
- the second voltage writing module is connected to a second gate of the thin-film transistor, and is configured to transmit at least two different voltages to the second gate of the thin-film transistor within different preset grayscale intervals in a time division manner; and
- the thin-film transistor and the light emitting module are connected in series between a first power line and a second power line, and the thin-film transistor is configured to drive the light emitting module to emit light during a light emitting stage.

Optionally, a control terminal of the first voltage writing module is connected to a first scan line, and a control terminal of the second voltage writing module is connected to the first scan line;

- optionally, the pixel circuit further includes a compensation module, the compensation module being connected between a first electrode of the thin-film transistor and the first gate, where a control terminal of the compensation module is connected to a second scan line, the first voltage writing module is connected between a first voltage signal line and a second electrode of the thin-film transistor, the first voltage writing module is configured to, in response to a first scan signal on the first scan line, be turned on during a data writing and compensation stage to transmit the data voltage on the first voltage signal line to the second electrode of the thin-film transistor, and the compensation module is configured to, in response to a second scan signal on the second scan line, be turned on during the data writing and compensation stage to write a voltage containing information about the data voltage and threshold voltage information to the first gate;

the second voltage writing module is connected between the second gate and a second voltage signal line; and optionally, the thin-film transistor is a metal oxide transistor.

The pixel circuit further includes a first light emission control module and a second light emission control module, where the first light emission control module is connected between the first power line and the first electrode of the thin-film transistor, the second light emission control module is connected between the second electrode of the thin-film transistor and a first terminal of the light emitting module, a second terminal of the light emitting module is connected to the second power line, a control terminal of the first light emission control module is connected to a first light emission control signal line, and a control terminal of the second light emission control module is connected to a second light emission control signal line, where the first light emission control module is configured to, in response to a first light emission control signal on the first light emission control signal line, be turned on at least during the light emitting stage and be turned off during the data writing and compensation stage; and the second light emission control module is configured to, in response to a second light emission control signal on the second light emission control signal line, be turned on during the light emitting stage.

Optionally, the pixel circuit further includes an initialization module, the initialization module being connected between an initialization signal line and the first terminal of the light emitting module, where a control terminal of the initialization module is connected to the second scan line, and the initialization module is configured to, in response to the second scan signal, transmit an initialization voltage on the initialization signal line to the first terminal of the light emitting module during an initialization stage; and optionally, the first light emission control module is further configured to, in response to the first light emission control signal, be turned on during the initialization stage to transmit a voltage transmitted on the first power line to the first gate through the compensation module.

The pixel circuit further includes a first storage module and a second storage module, where the first storage module is connected between the first gate and a first terminal of the light emitting module, and the second storage module is connected between the second gate and the first terminal of the light emitting module.

According to another aspect of the present disclosure, a driving method for a pixel circuit is provided. The pixel circuit includes a driving module, a first voltage writing module, a second voltage writing module, and a light emitting module, where the driving module includes the thin-film transistor according to any embodiment of the present disclosure; and the driving method for a pixel circuit includes:

during a data writing and compensation stage, controlling the first voltage writing module to transmit the data voltage to the thin-film transistor, so that the data voltage is written to the first gate, while controlling the second voltage writing module to transmit at least two different voltages to a second gate of the thin-film transistor within different preset grayscale intervals in a time division manner; and during a light emitting stage, controlling the thin-film transistor to drive the light emitting module to emit light.

Optionally, the pixel circuit further includes a compensation module, an initialization module, a first light emission control module, and a second light emission control module; the driving method for a pixel circuit further includes:

during an initialization stage, controlling the initialization module to transmit an initialization voltage on the initialization signal line to a first terminal of the light emitting module, and controlling the first light emission control module to transmit a voltage on a first power line to the first gate through the compensation module; and the during a data writing and compensation stage, controlling the first voltage writing module to transmit the data voltage to the thin-film transistor, so that the data voltage is written to the first gate, while controlling the second voltage writing module to transmit at least two different voltages to a second gate of the thin-film transistor within different preset grayscale intervals in a time division manner includes:

during the data writing and compensation stage, controlling the first gate to discharge through the compensation module, the thin-film transistor, and the first voltage writing module, in order to write a voltage containing information about the data voltage and threshold voltage information to the first gate; while controlling the second voltage writing module to transmit at least two different voltages to the second gate of the thin-film transistor within different preset grayscale intervals in a time division manner.

According to another aspect of the present disclosure, a display panel is provided, including the pixel circuit according to any embodiment of the present disclosure.

In the technical solutions according to embodiments of the present disclosure, the data voltage is applied to the first gate of the thin-film transistor, while the second gate is configured to use at least two different voltages within different preset grayscale intervals, and use the same voltage within the same preset grayscale interval, so as to adjust the characteristics of the thin-film transistor by applying different voltages to the second gate. In this way, the thin-film transistor is capable of balancing the characteristics of having a large subthreshold swing (SS) at a low grayscale and a large output current at a high grayscale. It can meet the display requirements at different grayscales without the need for adjusting the manufacturing process, thereby alleviating the mura phenomenon and enhancing the display effect of the display panel.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF DRAWINGS

In order to more clearly illustrate the technical solutions in the embodiments of the present disclosure, the drawings used in the description of the embodiments will be briefly described below. Obviously, the drawings in the following description are only some embodiments of the present disclosure, and a person skilled in the art can obtain other drawings according to the drawings without any creative work.

DETAILED DESCRIPTION OF THE INVENTION

Figure 1:
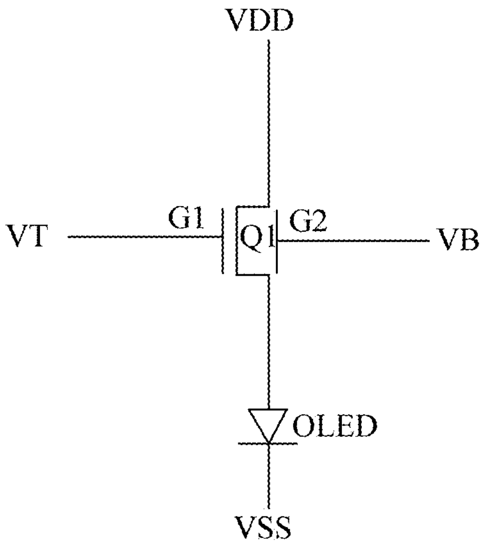
FIG. 1 is a schematic diagram of a structure of a pixel circuit according to an embodiment of the present disclosure.

To make the solutions of the present disclosure to be better understood by a person skilled in the art, the following clearly and completely describes the technical solutions in the embodiments of the present disclosure with reference to the accompanying drawings in the embodiments of the present disclosure. Apparently, the described embodiments are merely some rather than all of the embodiments of the present disclosure. On the basis of the embodiments of the present disclosure, all other embodiments obtained by those of ordinary skill in the art without involving any inventive effort fall within the scope of protection of the present disclosure.

It should be noted that the terms "first", "second" and the like in the specification and claims of the present disclosure as well as the above-mentioned accompanying drawings are used to distinguish similar objects, and are not necessarily used to describe a specific order or a precedence order. It should be understood that the data used in this way may be interchanged where appropriate, so that the embodiments of the present disclosure described herein may be implemented in a sequence other than those illustrated or described herein. In addition, the terms "include" and "have" and any variation thereof are intended to cover a non-exclusive inclusion, for example, a process, method, system, product, or apparatus that includes a series of steps or units is not necessarily limited to those steps or units that are explicitly listed, but may include other steps or units not explicitly listed or inherent to such a process, method, product or apparatus.

As described in BACKGROUND OF THE INVENTION, the existing display panels exhibit poor display effects. Through research, the inventor has found that the cause of the above problem lies in the fact as follows. The existing pixel circuits typically include oxide thin-film transistors. Oxide thin-film transistors possess characteristics such as high electron mobility and low leakage current, making them have advantages in reducing power consumption and enabling low-frequency driving. However, oxide thin-film transistors have a relatively small subthreshold swing (SS), which cannot be effectively improved through process tuning. SS is an important parameter when a thin-film transistor operates in a subthreshold state and functions as a logic switch. It is also known as an S-factor and serves as a performance indicator that measures a rate of transition between the on and off states of the thin-film transistor. When the SS is small, the gate-source voltage of the thin-film transistor experiences significant changes, which is unfavorable for low grayscale expansion and can easily lead to mura phenomena at a low grayscale. Conversely, when the SS is large, the output current of the thin-film transistor is relatively small, which is unfavorable for achieving high grayscale brightness. Therefore, when applied in pixel circuits, the existing oxide thin-film transistors cannot balance the characteristics of having a large SS at a low grayscale and having a large output current at a high grayscale, which hinders the enhancement of the display effect.

Figure 2:
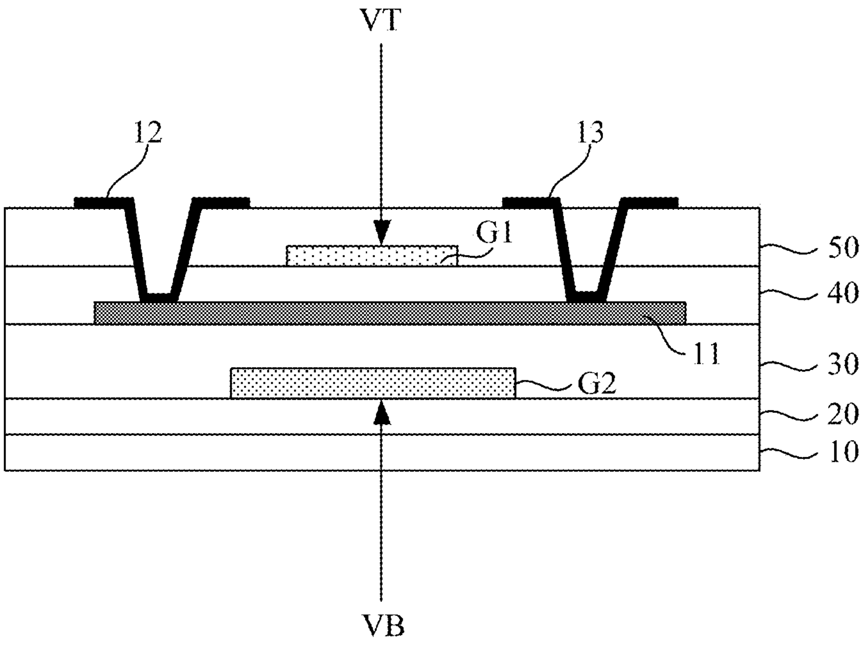
FIG. 2 is a schematic diagram of a structure of a thin-film transistor according to an embodiment of the present disclosure.

For the above problem, an embodiment of the present disclosure provides a thin-film transistor, in order to balance the characteristics of having a large SS at a low grayscale and a large output current at a high grayscale. FIG. 1 is a schematic diagram of a structure of a pixel circuit according to an embodiment of the present disclosure, which only schematically illustrates a connection relationship when a thin-film transistor Q1 is applied in a pixel circuit. FIG. 2 is a schematic diagram of a structure of a thin-film transistor according to an embodiment of the present disclosure. Referring to FIGS. 1 and 2, the thin-film transistor Q1 according to this embodiment is applied in the pixel circuit. The thin-film transistor Q1 includes a first gate G1 and a second gate G2, with the first gate G1 and the second gate G2 located on two opposite sides of an active layer 11 of the thin-film transistor Q1, the first gate G1 being applied with a data voltage, and the second gate G2 being configured to: use at least two different voltages within different preset grayscale intervals, and use the same voltage within the same preset grayscale interval.

Specifically, the thin-film transistor Q1 can serve as a driving transistor in the pixel circuit, with the thin-film transistor Q1 and a light emitting element (which, for example, may be an OLED device) connected between a first power line and a second power line. The thin-film transistor Q1 is configured to drive the light emitting element to emit light when a connection path between the first power line and the second power line is conducting. The first power line is used to transmit a first power supply voltage VDD and the second power line is used to transmit a second power supply voltage VSS. Here, the thin-film transistor Q1 is a vertical double-gate transistor, including a first gate G1 and a second gate G2. The first gate G1 may be a top gate and the second gate G2 may be a bottom gate.

As shown in FIG. 2, the thin-film transistor Q1 includes a substrate 10, a barrier layer 20 located on one side of the substrate 10, and a second gate G2 located on one side of the barrier layer 20 that is remote from the substrate 10. A second gate insulating layer 30 is formed on one side of the second gate G2 that is remote from the substrate 10, and an active layer 11 is formed on one side of the second gate insulating layer 30 that is remote from the substrate 10. The second gate insulating layer 30 is used to isolate the second gate G2 from the active layer 11. A first gate insulating layer 40 is formed on one side of the active layer 11 that is remote from the substrate 10, with the first gate G1 located on one side of the first gate insulating layer 40 that is remote from the substrate 10. The first gate insulating layer 40 is used to isolate the first gate G1 from the active layer 11, and an interlayer insulating layer 50 is formed on one side of the first gate G1 that is remote from the substrate 10. The thin-film transistor Q1 further includes a first electrode 12 and a second electrode 13. The first electrode 12 and the second electrode 13 are both connected to the active layer 11. The first electrode 12 may serve as a source and the second electrode 13 may serve as a drain, or alternatively, the first electrode 12 may serve as a drain and the second electrode 13 may serve as a source.

In this embodiment, a voltage VT of the first gate G1 of the thin-film transistor Q1 may be a data voltage, and a voltage VB of the second gate G2 changes with a display grayscale. Within different preset grayscale intervals, the voltage VB of the second gate G2 adopts at least two different voltages. For example, at a low grayscale, the voltage VB of the second gate G2 may be a voltage to control the current of the thin-film transistor Q1 to change slowly, thereby improving the SS of the thin-film transistor Q1. At other grayscales (such as high grayscales), another voltage is applied to the second gate G2 to adjust a threshold voltage of the thin-film transistor Q1, thereby increasing an output current of the thin-film transistor Q1.

Optionally, other grayscales may also include medium grayscales. At medium grayscales, a further voltage is applied to the second gate G2 to adjust output characteristics of the thin-film transistor Q1.

In the technical solutions according to embodiments of the present disclosure, the data voltage is applied to the first gate G1 of the thin-film transistor Q1, while the second gate G2 is configured to use at least two different voltages within different preset grayscale intervals, and use the same voltage within the same preset grayscale interval, so as to adjust the characteristics of the thin-film transistor Q1 by applying different voltages to the second gate G2. In this way, the thin-film transistor Q1 is capable of balancing the characteristics of having a large SS at a low grayscale and a large output current at a high grayscale. It can meet the display requirements at different grayscales without the need for adjusting the manufacturing process, thereby alleviating the mura phenomenon and enhancing the display effect of the display panel.

Optionally, the preset grayscale intervals include a first preset grayscale interval, a second preset grayscale interval, and a third preset grayscale interval, where any grayscale within the first preset grayscale interval is less than any grayscale within the second preset grayscale interval, and any grayscale within the second preset grayscale interval is less than any grayscale within the third preset grayscale interval. For example, grayscales within the first preset grayscale interval may all be low grayscales, grayscales within the second preset grayscale interval may all be medium grayscales, and grayscales within the third preset grayscale interval may all be high grayscales. Each preset grayscale interval corresponds to a voltage VB of a second gate G2. Here, the preset grayscale interval corresponds to a range of data voltages applied to the first gate G1, and the level of the data voltage corresponds to the level of the display grayscale. High, medium, and low grayscales represent relative states, which may be set according to actual display requirements. For example, grayscales may be roughly divided into seven levels: black, light black, dark gray, gray, light gray, grayish white, and white. Among them, black and light black may correspond to low grayscales, grayish white and white may correspond to high grayscales, and dark gray, gray, and light gray may correspond to the medium grayscales.

Within the first preset grayscale interval, the second preset grayscale interval, and the third preset grayscale interval, the second gate G2 of the thin-film transistor Q1 adopts at least two different voltages. The voltage applied to the second gate G2 within the third preset grayscale interval is at least different from the voltage applied to the second gate G2 within the first preset grayscale interval. In other words, the voltage applied to the second gate G2 within the third preset grayscale interval may be different from both the voltage applied to the second gate G2 within the second preset grayscale interval and the voltage applied to the second gate G2 within the first preset grayscale interval. Alternatively, the voltage applied to the second gate G2 within the third preset grayscale interval may be the same as the voltage applied to the second gate G2 within the second preset grayscale interval, but different from the voltage applied to the second gate G2 within the first preset grayscale interval.

Figure 3:
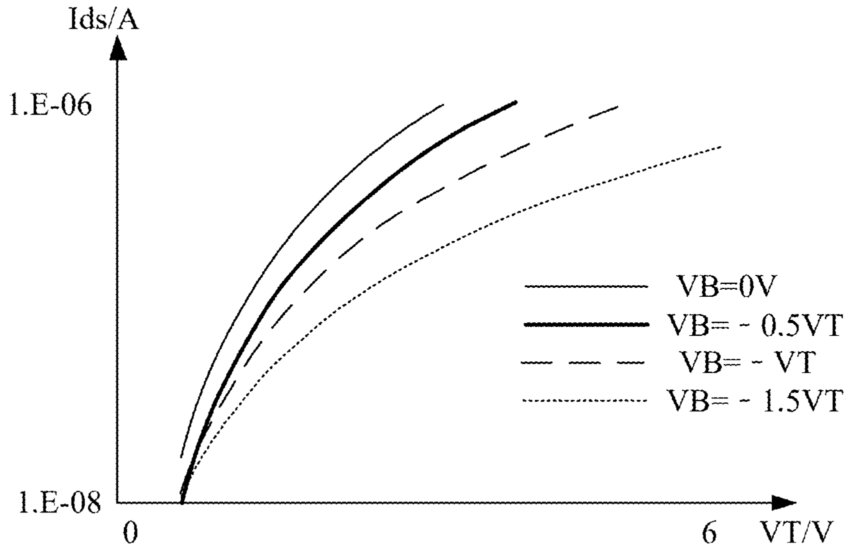
FIG. 3 is a characteristic curve of the variation of an output current with a voltage of a second gate in a thin-film transistor according to an embodiment of the present disclosure.

Optionally, in this embodiment, within the first preset grayscale interval, a voltage applied to the second gate G2 is a first voltage; within the second preset grayscale interval, the voltage applied to the second gate G2 is a second voltage; and within the third preset grayscale interval, the voltage applied to the second gate G2 is a third voltage. A direction of the first voltage is opposite to a direction of the data voltage, and a direction of the second voltage and a direction of the third voltage are both the same as the direction of the data voltage. Taking the thin-film transistor Q1 being a metal oxide transistor as an example, if the data voltage applied to its first gate G1 is a positive voltage, within the first preset grayscale interval, i.e., at low grayscales, the voltage applied to the second gate G2 is a negative voltage. FIG. 3 is a characteristic curve of the variation of an output current with a voltage of a second gate G2 in a thin-film transistor according to an embodiment of the present disclosure. Referring to FIGS. 2 and 3, within the first preset grayscale interval, when the voltage VT of the first gate G1 of the thin-film transistor Q1 is fixed, a negative voltage is applied to the second gate G2 based on a percentage (50%, 100%, and 150%) of the voltage VT of the first gate G1. As the voltage VB of the second gate G2 gradually decreases (with the percentage gradually increasing), an output current Ids of the thin-film transistor Q1 gradually decreases. In other words, when a positive voltage is applied to the first gate G1 of the thin-film transistor Q1 and a negative voltage is applied to the second gate G2, electric fields generated by the two voltages in opposite directions are also in opposite directions, weakening the electric field strength between the gates and the active layer 11, thereby reducing the output current of the thin-film transistor Q1. When the voltage VT of the first gate G1 changes, the output current of the thin-film transistor Q1 changes slowly due to the influence of the voltage VB of the second gate G2, thereby increasing the SS of the thin-film transistor Q1. This helps to reduce the display non-uniformity phenomenon and offers significant adjustment flexibility for low grayscale expansion, which is conducive to low grayscale expansion, thereby enhancing the display effect.

Within other preset grayscale intervals, other voltages different from the first voltage are applied to the second gate G2 of the thin-film transistor Q1. By adjusting the voltage VB of the second gate G2, the output current of the thin-film transistor Q1 is increased, thereby enhancing the display brightness at high and/or medium grayscales.

In the technical solution according to this embodiment, a positive data voltage is applied to the first gate G1 of the thin-film transistor Q1, causing the thin-film transistor Q1 to use a channel region on the first gate G1 side as the main channel to perform output. By adjusting the voltage VB of the second gate G2 within different preset grayscale intervals, the output characteristics of the thin-film transistor Q1 are modified. Within the first preset grayscale interval, a first voltage, opposite in direction to the data voltage, is applied to the second gate G2 to reduce the output current of the thin-film transistor Q1, thereby lowering a voltage change rate of the first gate G1 of the thin-film transistor Q1. This helps to improve the SS of the thin-film transistor Q1 and offers significant adjustment flexibility for low grayscale expansion, which is conducive to low grayscale expansion, thereby alleviating the mura phenomenon. Within the second preset grayscale interval, a second voltage is applied to the second gate G2, and within the third preset grayscale interval, a third voltage is applied to the second gate G2, in order to increase the output current of the thin-film transistor Q1, which is conducive to improving the grayscale brightness and enhancing the display effect.

Optionally, in an optional implementation according to this embodiment of the present disclosure, the first voltage is an adjustable voltage, and the second voltage and the third voltage are both fixed voltages. The first voltage is associated with the data voltage applied to the first gate G1 of the thin-film transistor Q1, and within the first preset grayscale interval, the first voltage changes as the data voltage. In this embodiment, a ratio of the first voltage to the data voltage ranges from −2 to −0.2, that is, the first voltage is equal to −2 to −0.2 times the data voltage. An absolute value of the second voltage may range from 0 V to 7 V, in order to ensure that the thin-film transistor Q1 can operate normally.

Figure 4:
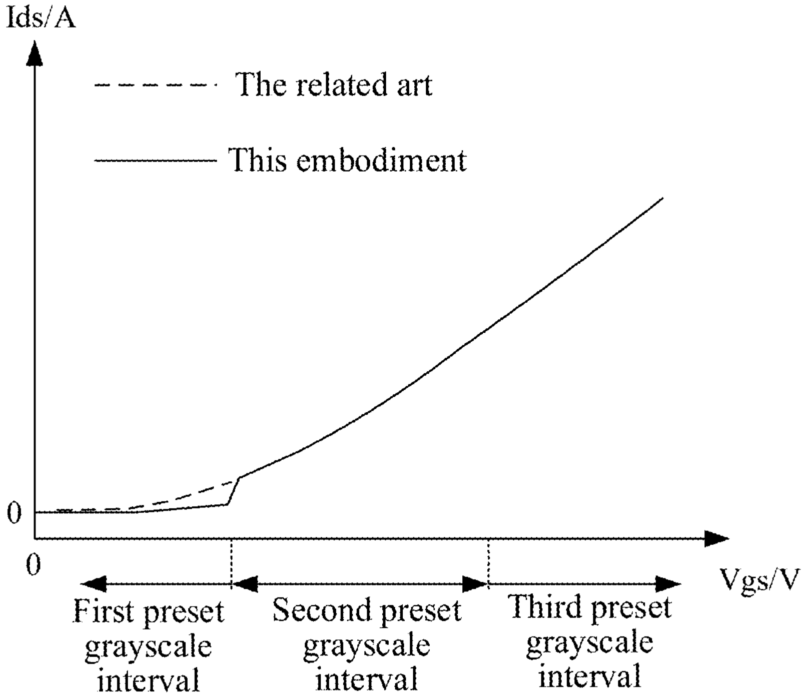
FIG. 4 is a schematic diagram of an output characteristic curve of a thin-film transistor according to an embodiment of the present disclosure.

FIG. 4 is a schematic diagram of an output characteristic curve of a thin-film transistor according to an embodiment of the present disclosure, where a dashed line is used to represent the output characteristics of a driving transistor in a pixel circuit in the related art, and a solid line is used to represent the output characteristics of the thin-film transistor Q1 according to this embodiment when used as a driving transistor. Referring to FIGS. 2 and 4, within the first preset grayscale interval, a negative first voltage is applied to the second gate G2 of the thin-film transistor Q1; and within the second preset grayscale interval and the third preset grayscale interval, a positive second voltage and a positive third voltage are applied to the second gate G2 of the thin-film transistor Q1, respectively. Here, the second voltage is reused as the third voltage, meaning that voltages applied to the second gate G2 of the thin-film transistor Q1 within the second preset grayscale interval and the third preset grayscale interval are the same. As can be seen from FIG. 4, within the first preset grayscale interval of low grayscales, the output current of the thin-film transistor Q1 according to this embodiment is less than the current in the related art, and within the second preset grayscale interval and the third preset grayscale interval of high grayscales, the output current of the thin-film transistor Q1 according to this embodiment is comparable to the current in the related art. Therefore, the technical solution according to this embodiment can reduce the output current of the thin-film transistor Q1 at low grayscales, and improve the SS of the thin-film transistor Q1, which is conducive to improving the display uniformity at low grayscales.

Optionally, in another optional implementation according to this embodiment of the present disclosure, the first voltage is an adjustable voltage, and the second voltage and the third voltage are both adjustable voltages. The first voltage is associated with the data voltage applied to the first gate G1 of the thin-film transistor Q1, and within the first preset grayscale interval, the first voltage changes as the data voltage. In this embodiment, a ratio of the first voltage to the data voltage ranges from −2 to −0.2, that is, the first voltage is equal to −2 to −0.2 times the data voltage. The second voltage and the third voltage are both adjustable positive voltages, so that the thin-film transistor Q1 performs output using the upper and lower channels, thereby increasing the output current. Here, a ratio of the second voltage to the data voltage ranges from 0.2 to 2, that is, the second voltage is equal to 0.2 to 2 times the data voltage.

Figure 5:
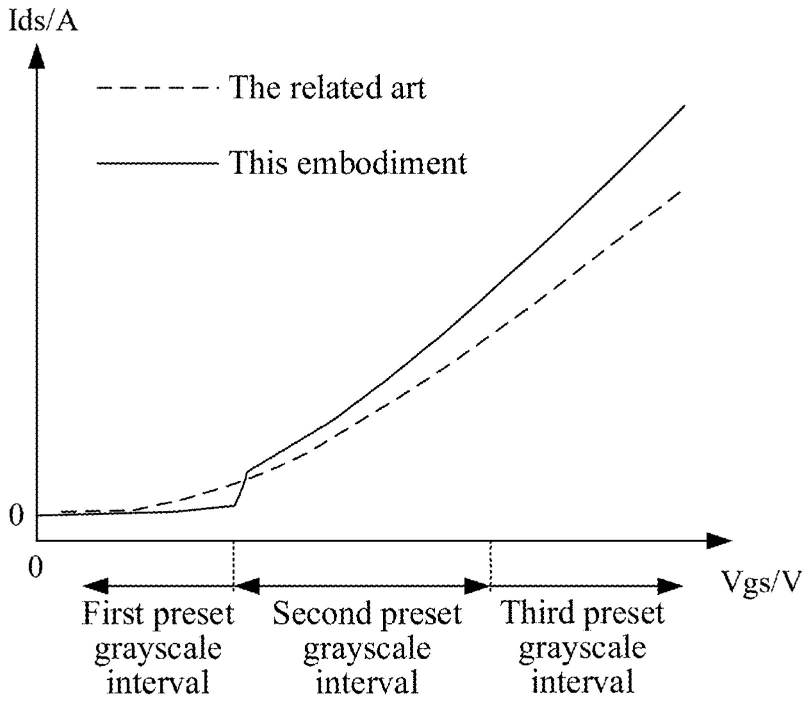
FIG. 5 is a schematic diagram of an output characteristic curve of another thin-film transistor according to an embodiment of the present disclosure.

FIG. 5 is a schematic diagram of an output characteristic curve of another thin-film transistor according to an embodiment of the present disclosure, where a dashed line is used to represent the output characteristics of a driving transistor in a pixel circuit in the related art, and a solid line is used to represent the output characteristics of the thin-film transistor Q1 according to this embodiment when used as a driving transistor. Referring to FIGS. 2 and 5, within the first preset grayscale interval, a negative first voltage is applied to the second gate G2 of the thin-film transistor Q1; and within the second preset grayscale interval and the third preset grayscale interval, a positive second voltage and a positive third voltage are applied to the second gate G2 of the thin-film transistor Q1, respectively. Here, the second voltage is reused as the third voltage, meaning that voltages applied to the second gate G2 of the thin-film transistor Q1 within the second preset grayscale interval and the third preset grayscale interval are the same. As can be seen from FIG. 5, within the first preset grayscale interval of low grayscales, the output current of the thin-film transistor Q1 according to this embodiment is less than the current in the related art, and within the second preset grayscale interval and the third preset grayscale interval of high grayscales, the output current of the thin-film transistor Q1 according to this embodiment is greater than the current in the related art. Therefore, the technical solution according to this embodiment can reduce the output current of the thin-film transistor Q1 at low grayscales, and improve the SS of the thin-film transistor Q1, which is conducive to improving the display uniformity at low grayscales. In addition, it can increase the output current of the thin-film transistor Q1 at medium and high grayscales, thus improving the grayscale brightness. This solution balances the characteristics of having a large SS at low grayscales and a large output current at medium and high grayscales. It can meet the display requirements at different grayscales without the need for adjusting the manufacturing process, thereby alleviating the mura phenomenon and enhancing the display effect of the display panel.

Optionally, in another optional implementation according to this embodiment of the present disclosure, the first voltage is an adjustable voltage, the second voltage is a fixed voltage, and the third voltage is an adjustable voltage. The first voltage is associated with the data voltage applied to the first gate G1 of the thin-film transistor Q1, and within the first preset grayscale interval, the first voltage changes as the data voltage. In this embodiment, a ratio of the first voltage to the data voltage ranges from −2 to −0.2, that is, the first voltage is equal to −2 to −0.2 times the data voltage. The second voltage may be any voltage between 0 V and 7 V, so that the thin-film transistor Q1 performs output mainly using a channel region on the first gate G1 side. The third voltage is an adjustable positive voltage, so that the thin-film transistor Q1 performs output using upper and lower channels, thereby increasing the output current. Here, a ratio of the third voltage to the data voltage ranges from 0.2 to 2, that is, the third voltage is equal to 0.2 to 2 times the data voltage.

Figure 6:
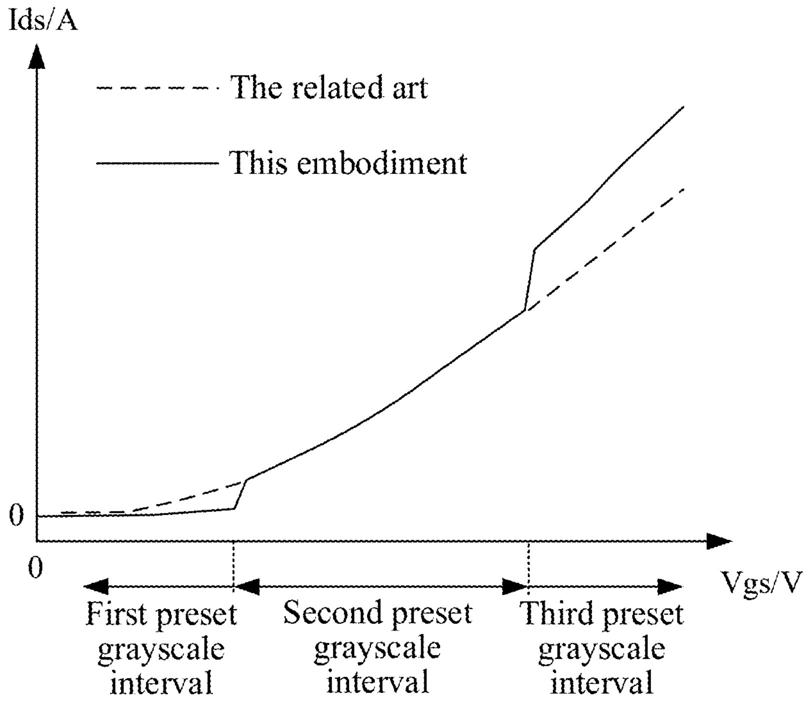
FIG. 6 is a schematic diagram of an output characteristic curve of another thin-film transistor according to an embodiment of the present disclosure.

FIG. 6 is a schematic diagram of an output characteristic curve of another thin-film transistor according to an embodiment of the present disclosure, where a dashed line is used to represent the output characteristics of a driving transistor in a pixel circuit in the related art, and a solid line is used to represent the output characteristics of the thin-film transistor Q1 according to this embodiment when used as a driving transistor. Referring to FIGS. 2 and 6, within the first preset grayscale interval, a negative first voltage is applied to the second gate G2 of the thin-film transistor Q1; and within the second preset grayscale interval, a positive second voltage is applied to the second gate G2 of the thin-film transistor Q1; and within the third preset grayscale interval, a positive third voltage is applied to the second gate G2 of the thin-film transistor Q1. As can be seen from FIG. 6, within the first preset grayscale interval of low grayscales, the output current of the thin-film transistor Q1 according to this embodiment is less than the current in the related art, within the second preset grayscale interval of high grayscales, the output current of the thin-film transistor Q1 according to this embodiment is equal to the current in the related art, and within the third preset grayscale interval, the output current of the thin-film transistor Q1 according to this embodiment is greater than the current in the related art. Therefore, the technical solution according to this embodiment can reduce the output current of the thin-film transistor Q1 at low grayscales, and improve the SS of the thin-film transistor Q1, which is conducive to improving the display uniformity at low grayscales. In addition, it can increase the output current of the thin-film transistor Q1 at high grayscales, thus improving the grayscale brightness. This solution balances the characteristics of having a large SS at low grayscales and a large output current at medium and high grayscales. It can meet the display requirements at different grayscales without the need for adjusting the manufacturing process, thereby alleviating the mura phenomenon and enhancing the display effect of the display panel.

Figure 7:
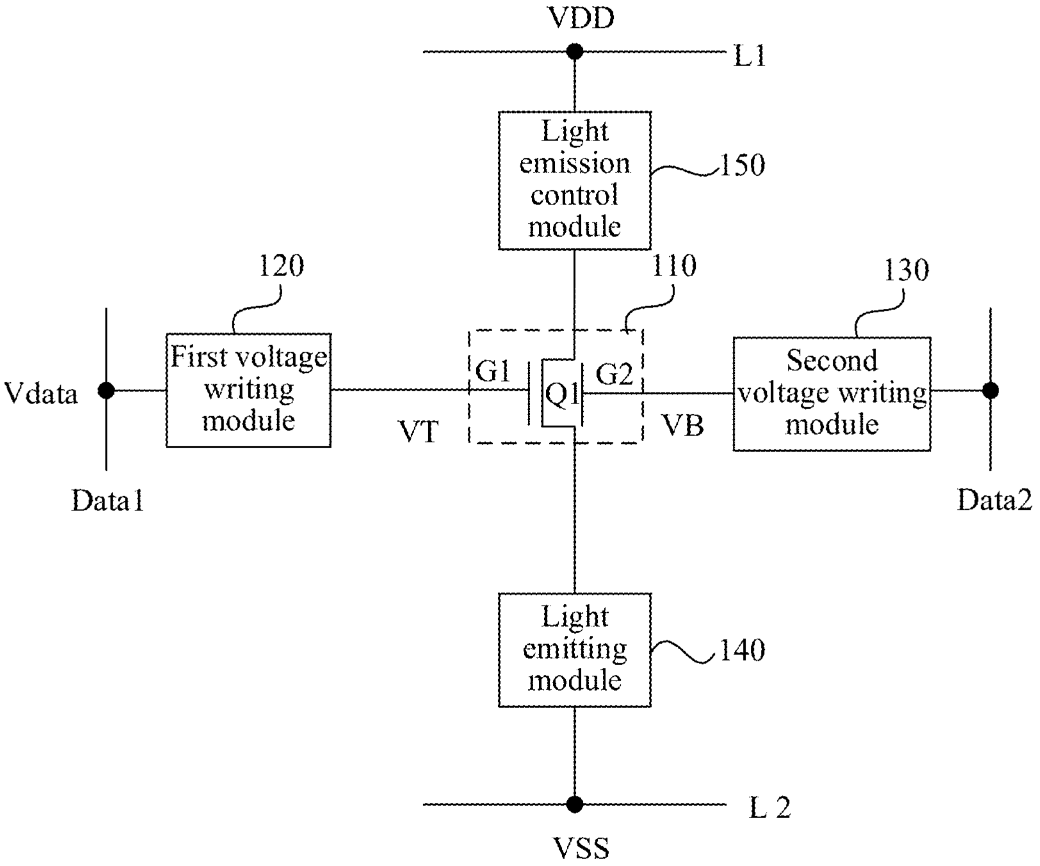
FIG. 7 is a schematic diagram of a structure of another pixel circuit according to an embodiment of the present disclosure.

Optionally, an embodiment of the present disclosure further provides a pixel circuit. FIG. 7 is a schematic diagram of a structure of another pixel circuit according to an embodiment of the present disclosure. Referring to FIG. 7, the pixel circuit according to this embodiment includes a driving module 110, a first voltage writing module 120, a second voltage writing module 130, and a light emitting module 140. The driving module 110 includes the thin-film transistor Q1 according to any one of the above embodiments. The first voltage writing module 120 is connected to the thin-film transistor Q1, and is configured to transmit the data voltage Vdata to the thin-film transistor Q1, so that the data voltage Vdata is written to a first gate G1 of the thin-film transistor Q1. The second voltage writing module 130 is connected to a second gate G2 of the thin-film transistor Q1, and is configured to transmit at least two different voltages to the second gate G2 of the thin-film transistor Q1 within different preset grayscale intervals in a time division manner. The thin-film transistor Q1 and the light emitting module 140 are connected in series between a first power line L1 and a second power line L2, and the thin-film transistor Q1 is configured to drive the light emitting module 140 to emit light during a light emitting stage. It should be noted that the threshold compensation process for the thin-film transistor Q1 is not involved in this embodiment.

The first power line L1 may be used to transmit a first power supply voltage VDD and the second power line L2 may be used to transmit a second power supply voltage VSS. The first power supply voltage VDD may be a positive voltage and the second power supply voltage VSS may be a negative voltage.

Optionally, a light emission control module 150 is also included on a connection path between the first power line L1 and the second power line L2, which is used to control the on and off of the connection path. Of course, in other embodiments, the voltage on the first power line L1 or the second power line L2 may be controlled to prevent the light emitting module 140 from emitting light during a non-light emitting stage.

In the technical solutions according to embodiments of the present disclosure, the data voltage is applied to the first gate G1 of the thin-film transistor Q1, while the second gate G2 is configured to use at least two different voltages within different preset grayscale intervals, and use the same voltage within the same preset grayscale interval, so as to adjust the characteristics of the thin-film transistor Q1 by applying different voltages to the second gate G2. In this way, the thin-film transistor Q1 is capable of balancing the characteristics of having a large SS at a low grayscale and a large output current at a high grayscale. It can meet the display requirements at different grayscales without the need for adjusting the manufacturing process, thereby alleviating the mura phenomenon and enhancing the display effect of the display panel.

Figure 8:
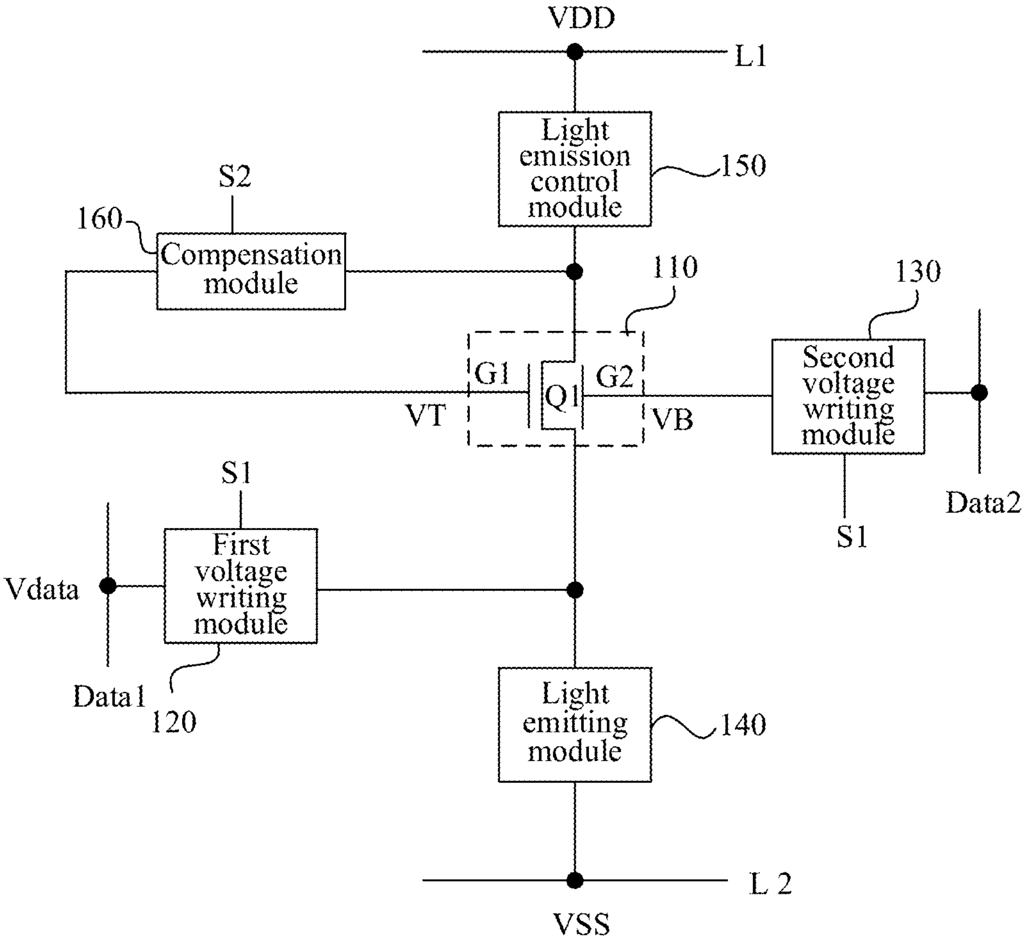
FIG. 8 is a schematic diagram of a structure of another pixel circuit according to an embodiment of the present disclosure.

FIG. 8 is a schematic diagram of a structure of another pixel circuit according to an embodiment of the present disclosure. Referring to FIG. 8, on the basis of the above embodiments, optionally, a control terminal of the first voltage writing module 120 is connected to a first scan line, and a control terminal of the second voltage writing module 130 is connected to the first scan line. The first voltage writing module 120 and the second voltage writing module 130 are turned on in response to a first scan signal S1 transmitted on the first scan line, respectively, and write corresponding voltages to the first gate G1 and the second gate G2 of the thin-film transistor Q1 at the same time, in order to adjust the characteristics of the thin-film transistor Q1 through the voltage VB of the second gate G2, thereby meeting the characteristic requirements at different grayscales.

Still referring to FIG. 8, the pixel circuit further includes a compensation module 160, the compensation module 160 being connected between a first electrode of the thin-film transistor Q1 and the first gate G1, where a control terminal of the compensation module 160 is connected to a second scan line, the first voltage writing module 120 is connected between a first voltage signal line Data1 and a second electrode of the thin-film transistor Q1, the first voltage writing module 120 is configured to, in response to a first scan signal S1 on the first scan line, be turned on during a data writing and compensation stage to transmit the data voltage Vdata on the first voltage signal line Data1 to the second electrode of the thin-film transistor Q1, and the compensation module 160 is configured to, in response to a second scan signal S2 on the second scan line, be turned on during the data writing and compensation stage to write a voltage containing information about the data voltage and threshold voltage information to the first gate G1, thereby completing the data writing and threshold voltage compensation to the thin-film transistor Q1. The second voltage writing module 130 is connected between the second gate G2 and a second voltage signal line Data2.

The thin-film transistor Q1 is a metal oxide transistor, which, for example, can be an indium gallium zinc oxide transistor. The first gate G1 may be a top gate and the second gate G2 may be a bottom gate. The first electrode of the thin-film transistor Q1 may be a drain and the second electrode of the thin-film transistor Q1 may be a source.

Using the pixel circuit shown in FIG. 8 as an example, an operation process of the pixel circuit includes at least a data writing and compensation stage and a light emitting stage.

During the data writing and compensation stage, the first voltage writing module 120 and the compensation module 160 are controlled to be turned on. The first voltage writing module 120 transmits the data voltage Vdata on the first voltage signal line Data1 to the second electrode of the thin-film transistor Q1, and the thin-film transistor Q1 is turned on. The voltage VT of the first gate G1 of the thin-film transistor Q1 is discharged through the compensation module 160, the thin-film transistor Q1, and the first voltage writing module 120. When a voltage difference between the first gate G1 and the second electrode of the thin-film transistor Q1 is equal to a threshold voltage of the thin-film transistor Q1, the thin-film transistor Q1 is turned off. At this point, the voltage VT of the first gate G1 of the thin-film transistor Q1 is a voltage associated with the threshold voltage of the thin-film transistor Q1 and the data voltage Vdata, thereby achieving data writing and threshold voltage compensation. In addition, the second voltage writing module 130 is further controlled to be turned on, and the second voltage writing module 130 writes the voltage transmitted on the second voltage signal line Data2 to the second gate G2 of the thin-film transistor Q1.

At different grayscales, the voltages transmitted on the second voltage signal line Data2 are different, so that the thin-film transistor Q1 has different characteristics at different grayscales, and therefore can balance the characteristics of having a high SS at low grayscales and a high output current at high grayscales. It can meet the display requirements at different grayscales without the need for adjusting the manufacturing process, thereby alleviating the mura phenomenon and enhancing the display effect of the display panel. Specifically, within the first preset grayscale interval, a voltage transmitted on the second voltage signal line Data2 is a first voltage; within the second preset grayscale interval, the voltage transmitted on the second voltage signal line Data2 is a second voltage; and within the third preset grayscale interval, the voltage transmitted on the second voltage signal line Data2 is a third voltage. For details of the first voltage, the second voltage, and the third voltage, reference may be made to the related description of the above embodiments, which will not be repeated here.

Optionally, the first voltage signal line Data1 and the second voltage signal line Data2 may both be data lines, and both connected to a driving chip.

During the light emitting stage, the light emission control module 150 is controlled to be turned on, so that the connection path between the first power line L1 and the second power line L2 is conducting, thereby controlling the thin-film transistor Q1 to drive the light emitting module 140 to emit light.

In the technical solution according to this embodiment of the present disclosure, the compensation module 160 is arranged between the first electrode and the first gate G1 of the thin-film transistor Q1, and the compensation module 160 and the first voltage access module 120 are controlled to be turned on during the data writing and compensation stage, in order to control the voltage VT of the first gate G1 of the thin-film transistor Q1 to be discharged through the compensation module 160, the thin-film transistor Q1, and the first voltage writing module 120, thereby achieving data writing and threshold voltage compensation of the thin-film transistor Q1 at the same time. In addition, the second voltage writing module 130 is controlled to be turned on during the data writing and compensation stage, and different voltages are transmitted to the second gate G2 of the thin-film transistor Q1 based on the preset grayscale interval, in order to adjust the output characteristics of the thin-film transistor Q1, so that the thin-film transistor Q1 has a large SS at low grayscales and a high output current at high grayscales, thereby alleviating the mura phenomenon and enhancing the display effect of the display panel.

Figure 9:
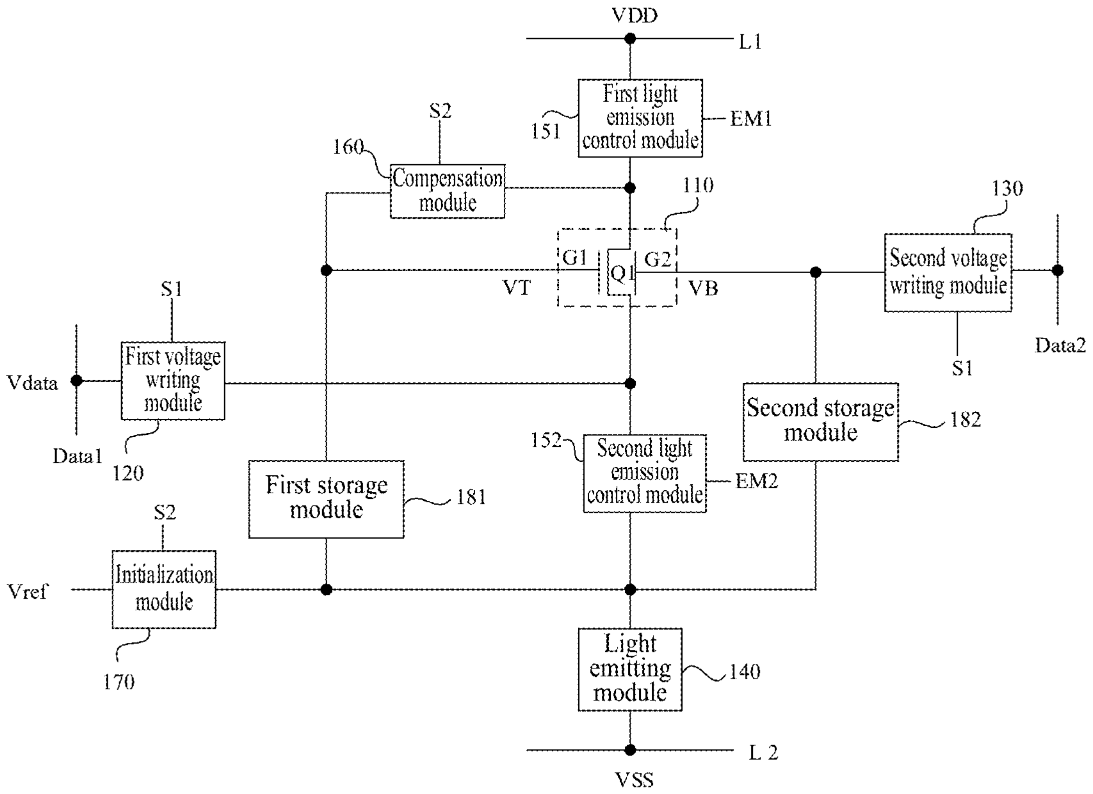
FIG. 9 is a schematic diagram of a structure of another pixel circuit according to an embodiment of the present disclosure.

FIG. 9 is a schematic diagram of a structure of another pixel circuit according to an embodiment of the present disclosure. Referring to FIG. 9, on the basis of the above embodiments, optionally, the pixel circuit further includes a first light emission control module 151 and a second light emission control module 152, where the first light emission control module 151 is connected between the first power line L1 and the first electrode of the thin-film transistor Q1, the second light emission control module 152 is connected between the second electrode of the thin-film transistor Q1 and a first terminal of the light emitting module 140, and a second terminal of the light emitting module 140 is connected to the second power line L2, a control terminal of the first light emission control module 151 is connected to a first light emission control signal line, and a control terminal of the second light emission control module 152 is connected to a second light emission control signal line.

The first light emission control module 151 is configured to, in response to a first light emission control signal EM1 on the first light emission control signal line, be turned on at least during the light emitting stage and be turned off during the data writing and compensation stage; and the second light emission control module 152 is configured to, in response to a second light emission control signal EM2 on the second light emission control signal line, be turned on during the light emitting stage.

Optionally, the pixel circuit further includes an initialization module 170, the initialization module 170 being connected between an initialization signal line and the first terminal of the light emitting module 140, where a control terminal of the initialization module 170 is connected to the second scan line, and the initialization module 170 is configured to, in response to the second scan signal S2, transmit an initialization voltage Vref on the initialization signal line to the first terminal of the light emitting module 140 during an initialization stage, in order to initialize the potential at the first terminal of the light emitting module 140.

The first light emission control module 151 is further configured to, in response to the first light emission control signal EM1, be turned on during the initialization stage to transmit a voltage transmitted on the first power line L1 to the first gate G1 through the compensation module 160, in order to initialize the potential of the first gate G1.

Optionally, the pixel circuit further includes a first storage module 181 and a second storage module 182, where the first storage module 181 is connected between the first gate G1 and a first terminal of the light emitting module 140, and the first storage module 181 is configured to store a voltage of the first gate G1, and the second storage module 182 is connected between the second gate G2 and the first terminal of the light emitting module 140 and the second storage module 182 is configured to store a voltage of the second gate G2.

Figure 10:
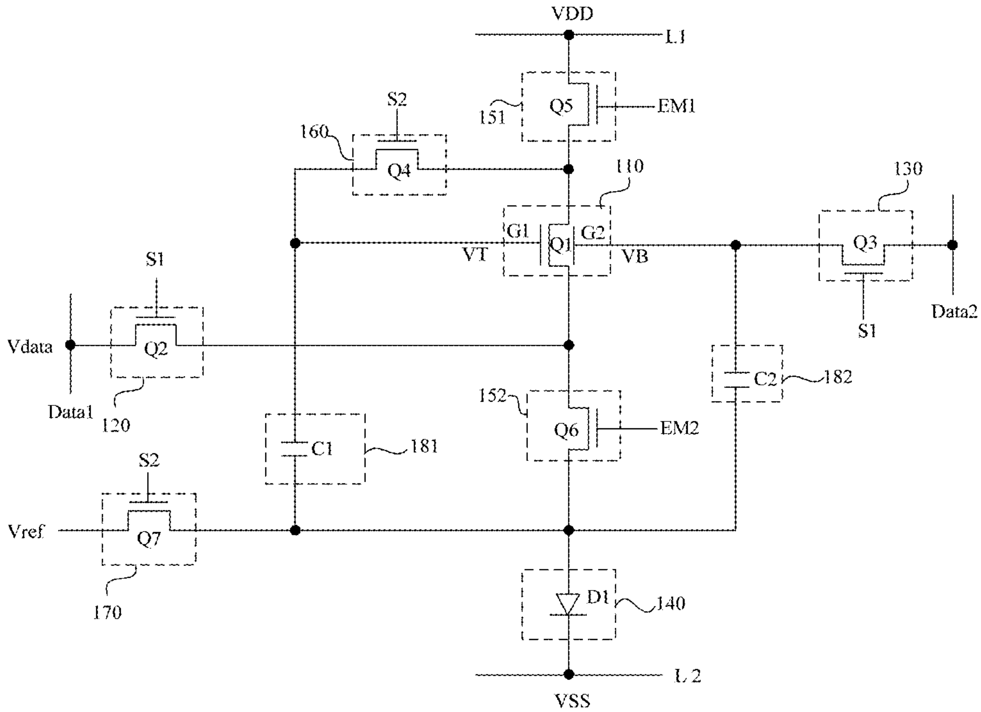
FIG. 10 is a schematic diagram of a structure of another pixel circuit according to an embodiment of the present disclosure.

FIG. 10 is a schematic diagram of a structure of another pixel circuit according to an embodiment of the present disclosure, and is specifically a schematic diagram of a structure of the pixel circuit shown in FIG. 9, which is refined as devices. Referring to FIG. 10, the first voltage writing module 120 includes a second transistor Q2, the second voltage writing module 130 includes a third transistor Q3, the compensation module 160 includes a fourth transistor Q4, the first light emission control module 151 includes a fifth transistor Q5, the second light emission control module 152 includes a sixth transistor Q6, the initialization module 170 includes a seventh transistor Q7, the first storage module 181 includes a first capacitor C1, the second storage module 182 includes a second capacitor C2, and the light emitting module 140 includes a light emitting diode D1.

A gate of the second transistor Q2 is connected to a first scan line, a first electrode of the second transistor Q2 is connected to the first voltage signal line Data1, a second electrode of the second transistor Q2 is connected to the second electrode of the thin-film transistor Q1, a gate of the third transistor Q3 is connected to the first scan line, a first electrode of the third transistor Q3 is connected to the second voltage signal line Data2, and a second electrode of the third transistor Q3 is connected to the second gate G2 of the thin-film transistor Q1. A gate of the fourth transistor Q4 is connected to the second scan line, a first electrode of the fourth transistor Q4 is connected to the first electrode of the thin-film transistor Q1, and a second electrode of the fourth transistor Q4 is connected to the first gate G1 of the thin-film transistor Q1.

A gate of the fifth transistor Q5 is connected to the first light emission control signal line, a first electrode of the fifth transistor Q5 is connected to the first power line L1, and a second electrode of the fifth transistor Q5 is connected to the first electrode of the thin-film transistor Q1. A gate of the sixth transistor Q6 is connected to the second light emission control signal line, a first electrode of the sixth transistor Q6 is connected to the second electrode of the thin-film transistor Q1, a second electrode of the sixth transistor Q6 is connected to a first electrode of the light emitting diode D1, and a second electrode of the light emitting diode D1 is connected to the second power line L2. A gate of the seventh transistor Q7 is connected to the second scan line, a first electrode of the seventh transistor Q7 is connected to the initialization signal line, and a second electrode of the seventh transistor Q7 is connected to the first electrode of the light emitting diode D1.

The first capacitor C1 is connected between the first gate G1 of the thin-film transistor Q1 and the first electrode of the light emitting diode D1, and the second capacitor C2 is connected between the second gate G2 of the thin-film transistor Q1 and the first electrode of the light emitting diode D1.

Figure 11:
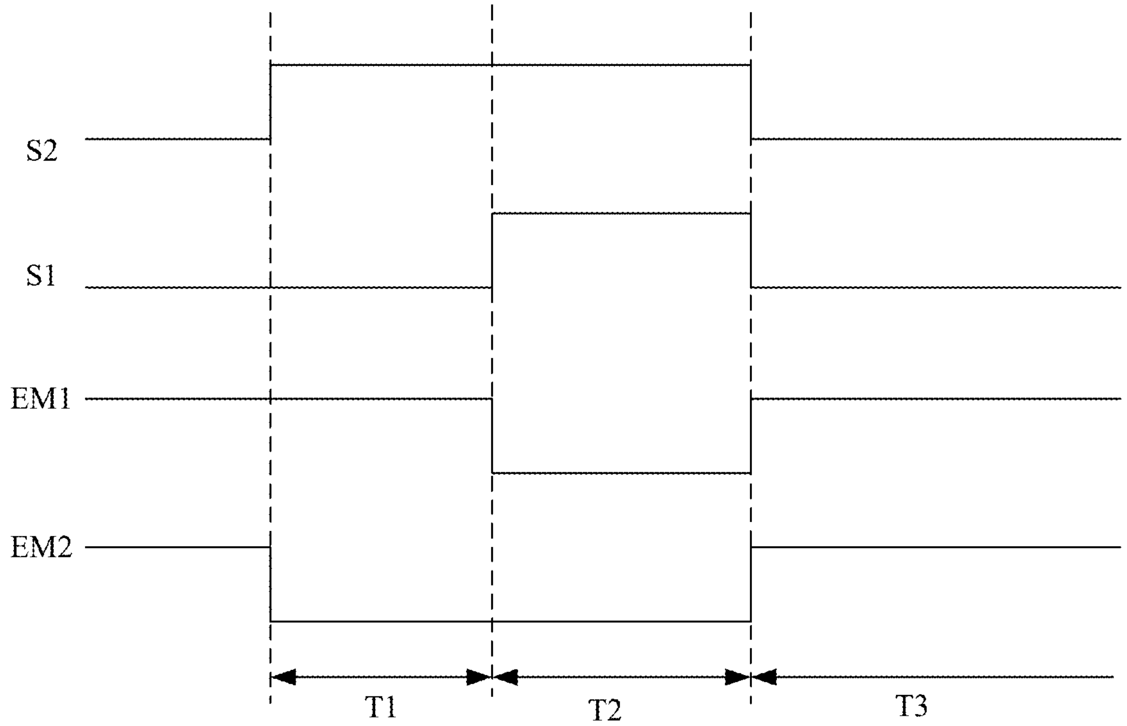
FIG. 11 is a schematic diagram of drive timing of a pixel circuit according to an embodiment of the present disclosure.

FIG. 11 is a schematic diagram of drive timing of a pixel circuit according to an embodiment of the present disclosure, which is applicable to the pixel circuit shown in FIG. 10. Referring FIGS. 10 and 11, taking all transistors being N-type transistors as an example, an operation process of the pixel circuit according to this embodiment includes an initialization stage T1, a data writing and compensation stage T2, and a light emitting stage T3.

During the initialization stage T1, the first scan signal S1 transmitted on the first scan line is at a low level, the second scan signal S2 transmitted on the second scan line is at a high level, the first light emission control signal EM1 transmitted on the first light emission control signal line is at a high level, and the second light emission control signal EM2 transmitted on the second light emission control signal line is at a low level. Therefore, the fourth transistor Q4, the fifth transistor Q5, and the seventh transistor Q7 are turned on. The initialization voltage Vref on the initialization signal line is transmitted to the first electrode of the light emitting diode D1 and the second electrode of the first capacitor C1 through the seventh transistor Q7, in order to initialize the first electrode of the light emitting diode D1 and the second electrode of the first capacitor C1. In addition, the first power supply voltage VDD transmitted on the first power line L1 is transmitted to the first gate G1 of the thin-film transistor Q1 through the fifth transistor Q5 and the fourth transistor Q4, in order to initialize the first gate G1. In this case, the voltage VT of the first gate G1 is the first power supply voltage VDD.

During the data writing and compensation stage T2, the first scan signal S1 transmitted on the first scan line is at a high level, the second scan signal S2 transmitted on the second scan line is at a high level, the first light emission control signal EM1 transmitted on the first light emission control signal line is at a low level, and the second light emission control signal EM2 transmitted on the second light emission control signal line is at a low level. Therefore, the second transistor Q2, the third transistor Q3, the fourth transistor Q4, and the seventh transistor Q7 are turned on. The data voltage Vdata on the first voltage signal line Data1 is transmitted to the second electrode of the thin-film transistor Q1 through the second transistor Q2, causing the thin-film transistor Q1 to be turned on. The first gate G1 of the thin-film transistor Q1 discharges through the fourth transistor Q4, the thin-film transistor Q1, and the second transistor Q2 until the voltage of the first gate G1, VT, equals Vdata+Vth1, where Vth1 is the threshold voltage of the thin-film transistor Q1, thereby achieving data writing and threshold voltage compensation of the thin-film transistor Q1. In addition, the voltage transmitted on the second voltage signal line Data2 is transmitted to the second gate G2 of the thin-film transistor Q1 through the third transistor Q3. At different grayscales, the voltages transmitted on the second voltage signal line Data2 are different, so that the thin-film transistor Q1 has different characteristics at different grayscales, and therefore can balance the characteristics of having a high SS at low grayscales and a high output current at high grayscales.

During the light emitting stage T3, the first scan signal S1 transmitted on the first scan line is at a low level, the second scan signal S2 transmitted on the second scan line is at a low level, the first light emission control signal EM1 transmitted on the first light emission control signal line is at a high level, and the second light emission control signal EM2 transmitted on the second light emission control signal line is at a high level. Therefore, the fifth transistor Q5 and the sixth transistor Q6 are turned on, enabling the connection path between the first power line L1 and the second power line L2 to be turned on, which allows the thin-film transistor Q1 to generate a driving current Ids that drives the light emitting diode D1 to emit light. The driving current Ids may be expressed as the following expression:

$$I = \frac{1}{2}\mu C_{ox}\frac{W}{L}(Vgs - Vth1)^2 = \frac{1}{2}\mu C_{ox}\frac{W}{L}(Vdata + Vth1 - Vref - Vth1)^2 = \frac{1}{2}\mu C_{ox}\frac{W}{L}(Vdata - Vref)^2.$$

where μ is the electron mobility of the thin-film transistor Q1, Cox is the channel capacitance per unit area of the thin-film transistor Q1, and W/L is the width-to-length ratio of the thin-film transistor Q1. As can be learned from the above expression, the driving current of the pixel circuit according to this embodiment is not affected by the threshold voltage Vth1 of the thin-film transistor Q1.

It should be understood that, during the light emitting stage, within the same preset grayscale interval, even if the data voltage Vdata changes, the voltage difference between the second gate G2 and the second electrode of the thin-film transistor Q1 still remains unchanged under the action of the second capacitor C2. Therefore, in the case where the voltage transmitted on the second voltage signal line Data2 remains unchanged, the output characteristics of the thin-film transistor Q1 will not change.

Figure 12:
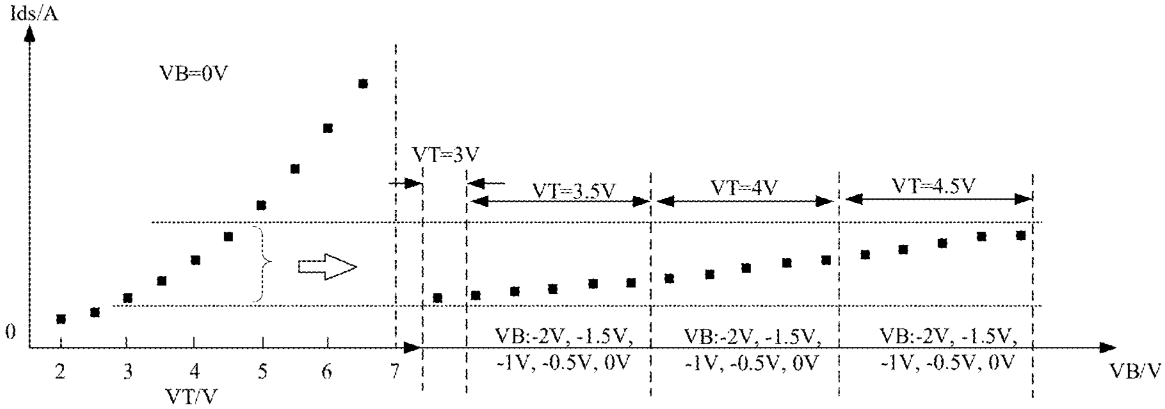
FIG. 12 is a schematic diagram of an output characteristic curve of another thin-film transistor according to an embodiment of the present disclosure.

FIG. 12 is a schematic diagram of an output characteristic curve of another thin-film transistor according to an embodiment of the present disclosure, specifically a characteristic curve of the thin-film transistor Q1 in the pixel circuit shown in FIG. 11 at different voltages VT of the first gate G1 and different voltages VB of the second gate G2. Referring to FIG. 12, when the voltage VB applied to the second gate G2 equals 0 V, during low grayscale expansion, only grayscales for a small number of current gradients can be expanded within a fixed current interval. For example, if the voltage VT of the first gate G1 is within an interval of 3 V to 4.5 V, only three current gradients may be expanded. However, when a variable voltage is applied to the second gate G2, in the case where the voltage VT of the first gate G1 is 3 V, 3.5 V, 4 V, and 4.5 V, respectively, by adjusting the voltage VB applied to the second gate G2 (taking 0.5 V as the minimum expansion voltage as an example, the specific voltage value may be adjusted proportionally based on the data voltage Vdata), fifteen current gradients can be expanded within the same current interval (expanded in the case where the voltage VB applied to the second gate G2 is −2 V, −1.5 V, −1 V, −0.5 V, and 0 V, respectively), which is more conducive to low grayscale expansion, thereby improving the display uniformity.

Figure 13:
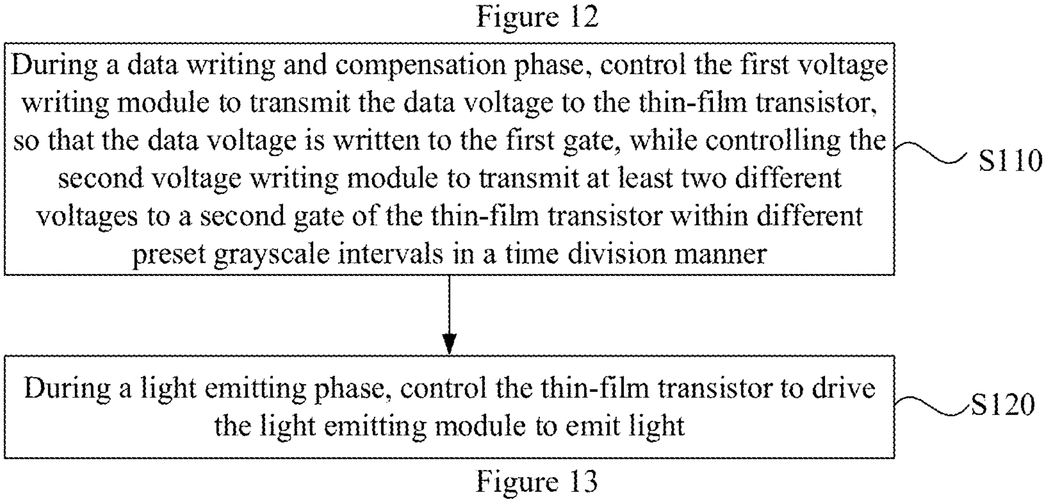
FIG. 13 is a flowchart of a driving method for a pixel circuit according to an embodiment of the present disclosure.

Optionally, the present disclosure further provides a driving method for a pixel circuit, which may be used to drive the pixel circuit according to any one of the above embodiments. FIG. 13 is a flowchart of a driving method for a pixel circuit according to an embodiment of the present disclosure. Referring to FIGS. 7 and 13, the driving method for a pixel circuit includes:

S110: During a data writing and compensation stage, control the first voltage writing module to transmit the data voltage to the thin-film transistor, so that the data voltage is written to the first gate, while controlling the second voltage writing module to transmit at least two different voltages to a second gate of the thin-film transistor within different preset grayscale intervals in a time division manner.

S120: During a light emitting stage, control the thin-film transistor to drive the light emitting module to emit light.

Since the driving method for a pixel circuit is used to drive the pixel circuit according to any embodiment of the present disclosure, the driving method for a pixel circuit also possesses the beneficial effects described in any of the above embodiments, which will not be repeated.

Figure 14:
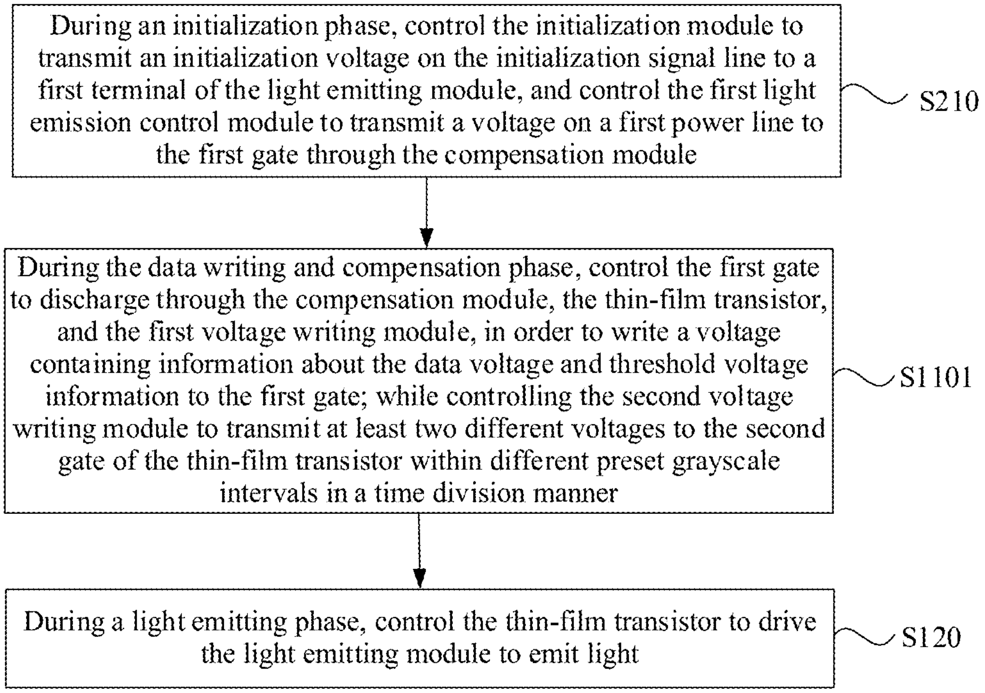
FIG. 14 is a flowchart of another driving method for a pixel circuit according to an embodiment of the present disclosure.

FIG. 14 is a flowchart of another driving method for a pixel circuit according to an embodiment of the present disclosure. The driving method for a pixel circuit according to this embodiment includes:

S210: During an initialization stage, control the initialization module to transmit an initialization voltage on the initialization signal line to a first terminal of the light emitting module, and control the first light emission control module to transmit a voltage on a first power line to the first gate through the compensation module.

S1101: During the data writing and compensation stage, control the first gate to discharge through the compensation module, the thin-film transistor, and the first voltage writing module, in order to write a voltage containing information about the data voltage and threshold voltage information to the first gate; while controlling the second voltage writing module to transmit at least two different voltages to the second gate of the thin-film transistor within different preset grayscale intervals in a time division manner.

S120: During a light emitting stage, control the thin-film transistor to drive the light emitting module to emit light.

For details of an operation process of the driving method for a pixel circuit shown in FIG. 14, reference may be made to the related description of 10, and the same technical effects may be achieved, which will not be repeated.

Figure 15:
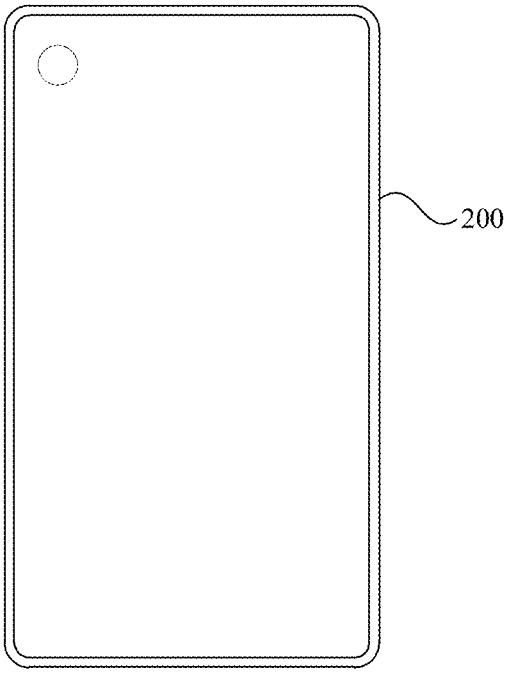
FIG. 15 is a schematic diagram of a structure of a display panel according to an embodiment of the present disclosure.

Optionally, the present disclosure further provides a display panel, including the pixel circuit according to any embodiment of the present disclosure. Therefore, the display panel according to this embodiment of the present disclosure also possesses the beneficial effects described in any of the above embodiments. FIG. 15 is a schematic diagram of a structure of a display panel according to an embodiment of the present disclosure. Referring to FIG. 15, the display panel 200 may be a panel of a mobile phone shown in FIG. 15, or it may be a panel of any electronic product with a display function, including, but not limited to, the following categories: a television, a laptop computer, a desktop monitor, a tablet computer, a digital camera, a smart bracelet, smart glasses, an in-vehicle display, medical equipment, industrial control equipment, a touch interactive terminal, etc., which is not specifically limited in the embodiments of the present disclosure.

It should be understood that the steps may be reordered, added, or deleted using the various forms of processes illustrated above. For example, the steps recorded in the present disclosure may be performed in parallel, sequentially, or in a different order, provided that the desired results of the technical solutions of the present disclosure can be achieved, which are not limited here.

The above detailed description of the present disclosure do not constitute a limitation on the scope of protection of the present disclosure. It will be apparent to those skilled in the art that various modifications, combinations, sub-combinations, and substitutions can be made based on design requirements and other factors. Any modifications, equivalent substitutions, improvements, and the like made within the spirit and principle of the present disclosure shall fall within the scope of protection of the present disclosure.

What is claimed is:

1. A thin-film transistor, applied to a pixel circuit, and comprising:

a first gate, configured to be applied with a data voltage;

a second gate, located on two opposite sides of an active layer of the thin-film transistor with the first gate, and configured to: use at least two different voltages within different preset grayscale intervals, and use the same voltage within the same preset grayscale interval, wherein the pixel circuit comprises a first voltage writing module, a second voltage writing module, and a compensation module;

wherein a control terminal of the first voltage writing module is connected to a first scan line, and a control terminal of the second voltage writing module is connected to the first scan line;

wherein the compensation module is connected between a first electrode of the thin-film transistor and the first gate, wherein a control terminal of the compensation module is connected to a second scan line, the first voltage writing module is connected between a first voltage signal line and a second electrode of the thin-film transistor, the first voltage writing module is configured to, in response to a first scan signal on the first scan line, be turned on during a data writing and compensation stage to transmit the data voltage on the first voltage signal line to the second electrode of the thin-film transistor, and the compensation module is configured to, in response to a second scan signal on the second scan line, be turned on during the data writing and compensation stage to write a voltage containing information about the data voltage and threshold voltage information to the first gate;

the second voltage writing module is connected between the second gate and a second voltage signal line; and the thin-film transistor is a metal oxide transistor.

2. The thin-film transistor according to claim 1, wherein the preset grayscale intervals comprise a first preset grayscale interval, a second preset grayscale interval, and a third preset grayscale interval, one grayscale within the first preset grayscale interval is less than one grayscale within the second preset grayscale interval, and one grayscale within the second preset grayscale interval is less than one grayscale within the third preset grayscale interval; and a voltage applied to the second gate within the third preset grayscale interval is at least different from a voltage applied to the second gate within the first preset grayscale interval.

3. The thin-film transistor according to claim 2, wherein within the first preset grayscale interval, a voltage applied to the second gate is a first voltage;

within the second preset grayscale interval, the voltage applied to the second gate is a second voltage; and within the third preset grayscale interval, the voltage applied to the second gate is a third voltage, wherein a direction of the first voltage is opposite to a direction of the data voltage, and a direction of the second voltage and a direction of the third voltage are both the same as the direction of the data voltage.

4. The thin-film transistor according to claim 3, wherein the first voltage is an adjustable voltage, and the second voltage and the third voltage are both fixed voltages.

5. The thin-film transistor according to claim 3, wherein the first voltage is an adjustable voltage, the second voltage is a fixed voltage, and the third voltage is an adjustable voltage;

a ratio of the first voltage to the data voltage ranges from −2 to −0.2.

6. The thin-film transistor according to claim 4, wherein a ratio of the first voltage to the data voltage ranges from −2 to −0.2.

7. The thin-film transistor according to claim 6, wherein the second voltage is reused as the third voltage, and an absolute value of the second voltage ranges from 0 V to 7 V.

8. The thin-film transistor according to claim 7, wherein the thin-film transistor according to claim 3, wherein the first voltage is an adjustable voltage, and the second voltage and the third voltage are both adjustable voltages.

9. The thin-film transistor according to claim 8, wherein a ratio of the first voltage to the data voltage ranges from −2 to −0.2.

10. The thin-film transistor according to claim 9, wherein the second voltage is reused as the third voltage, and a ratio of the second voltage to the data voltage ranges from 0.2 to 2.

11. A pixel circuit, comprising a driving module, a first voltage writing module, a second voltage writing module, and a light emitting module, wherein the driving module comprises the thin-film transistor according to claim 1;

the first voltage writing module is connected to the thin-film transistor, and is configured to transmit the data voltage to the thin-film transistor to write the data voltage to a first gate of the thin-film transistor;

the second voltage writing module is connected to a second gate of the thin-film transistor, and is configured to transmit at least two different voltages to the second gate of the thin-film transistor within different preset grayscale intervals in a time division manner; and the thin-film transistor and the light emitting module are connected in series between a first power line and a second power line, and the thin-film transistor is configured to drive the light emitting module to emit light during a light emitting stage, wherein the pixel circuit comprises a first voltage writing module, a second voltage writing module, and a compensation module;

wherein a control terminal of the first voltage writing module is connected to a first scan line, and a control terminal of the second voltage writing module is connected to the first scan line;

wherein the compensation module is connected between a first electrode of the thin-film transistor and the first gate, wherein a control terminal of the compensation module is connected to a second scan line, the first voltage writing module is connected between a first voltage signal line and a second electrode of the thin-film transistor, the first voltage writing module is configured to, in response to a first scan signal on the first scan line, be turned on during a data writing and compensation stage to transmit the data voltage on the first voltage signal line to the second electrode of the thin-film transistor, and the compensation module is configured to, in response to a second scan signal on the second scan line, be turned on during the data writing and compensation stage to write a voltage containing information about the data voltage and threshold voltage information to the first gate;

the second voltage writing module is connected between the second gate and a second voltage signal line; and the thin-film transistor is a metal oxide transistor.

12. The pixel circuit according to claim 11, further comprising a first light emission control module and a second light emission control module, wherein the first light emission control module is connected between the first power line and the first electrode of the thin-film transistor, the second light emission control module is connected between the second electrode of the thin-film transistor and a first terminal of the light emitting module, a second terminal of the light emitting module is connected to the second power line, a control terminal of the first light emission control module is connected to a first light emission control signal line, and a control terminal of the second light emission control module is connected to a second light emission control signal line, wherein the first light emission control module is configured to, in response to a first light emission control signal on the first light emission control signal line, be turned on at least during the light emitting stage and be turned off during the data writing and compensation stage; and the second light emission control module is configured to, in response to a second light emission control signal on the second light emission control signal line, be turned on during the light emitting stage.

13. The pixel circuit according to claim 12, further comprising an initialization module, the initialization module being connected between an initialization signal line and the first terminal of the light emitting module, wherein a control terminal of the initialization module is connected to the second scan line, and the initialization module is configured to, in response to the second scan signal, transmit an initialization voltage on the initialization signal line to the first terminal of the light emitting module during an initialization stage.

14. The pixel circuit according to claim 13, the first light emission control module is further configured to, in response to the first light emission control signal, be turned on during the initialization stage to transmit a voltage transmitted on the first power line to the first gate through the compensation module.

15. The pixel circuit according to claim 13, further comprising a first storage module and a second storage module, wherein the first storage module is connected between the first gate and a first terminal of the light emitting module, and the second storage module is connected between the second gate and the first terminal of the light emitting module.

16. A driving method for a pixel circuit, wherein the pixel circuit comprises:

a driving module, a first voltage writing module, a second voltage writing module, a compensation module, and a light emitting module, wherein the driving module comprises the thin-film transistor according to claim 1;

the compensation module is connected between a first electrode of the thin-film transistor and the first gate, and the first voltage writing module is connected between a first voltage signal line and a second electrode of the thin-film transistor; and the driving method for a pixel circuit comprises:

during a data writing and compensation stage, controlling the first voltage writing module to transmit the data voltage to the thin-film transistor, and controlling the first gate to discharge through the compensation module, the thin-film transistor, and the first voltage writing module, in order to write a data voltage containing information about the data voltage and threshold voltage information to the first gate, while controlling the second voltage writing module to transmit at least two different voltages to a second gate of the thin-film transistor within different preset grayscale intervals in a time division manner; and during a light emitting stage, controlling the thin-film transistor to drive the light emitting module to emit light.

* * * * *